United States Patent [19]

Grünbaum

[11] 4,112,751
[45] Sep. 12, 1978

[54] ARRANGEMENT FOR MEASURING A RADIAL FORCE APPLIED TO A BEARING

[76] Inventor: Heinrich Grünbaum, Am Bollwerk 6, CH-4102 Binningen, Switzerland

[21] Appl. No.: 809,515

[22] Filed: Jun. 24, 1977

[30] Foreign Application Priority Data

Jun. 28, 1976 [CH] Switzerland .................. 008323/76

[51] Int. Cl.² .............................................. G01L 5/10
[52] U.S. Cl. .................................... 75/141 A; 73/144
[58] Field of Search ................. 73/144, 143, DIG. 2

[56] References Cited

U.S. PATENT DOCUMENTS

| 3,258,962 | 7/1966 | Dahle | 73/141 A |
|---|---|---|---|
| 3,763,701 | 10/1973 | Wright et al. | 73/144 |
| 3,824,846 | 7/1974 | Andersson | 73/144 X |
| 4,015,468 | 4/1977 | Simon | 73/136 R |

FOREIGN PATENT DOCUMENTS 2,031,979  1/1972  Fed. Rep. of Germany .............. 73/143

OTHER PUBLICATIONS

Ellis et al.—IBM Technical Disclosure Bulletin, vol. 16, No. 7, pp. 2267–2268, Dec. 1973.

*Primary Examiner*—Charles A. Ruehl
*Attorney, Agent, or Firm*—Michael J. Striker

[57] ABSTRACT

An arrangement for measuring a radial force applied to a roller bearing of a device has an inner element connected with the roller bearing for joint displacement therewith under the action of this force, an outer element mountable on the device and outwardly surrounding the inner element so as to form a gap therebetween, and a web extending through the gap and connecting the elements with each other. The web is stressed in response to displacement of the inner element with the roller bearing in a generally radial direction of the gap, whereby signals commensurate with the degree of stressing of the web are originated. The elements may be formed as rings concentric with each other, and the web may extend in the radial direction of the rings. Instrumentalities are provided for transmitting the above signals, such as electrical signalling instrumentalities. The latter may include two strain gauges mounted on the web. An arrangement may be provided for limiting the displacement of the inner element relative to the outer element.

7 Claims, 7 Drawing Figures

ARRANGEMENT FOR MEASURING A RADIAL FORCE APPLIED TO A BEARING

BACKGROUND OF THE INVENTION

The present invention relates to an arrangement for measuring a radial force applied to a bearing, particularly a roller bearing.

Arrangements for measuring radial forces applied to roller bearings have found a wide use in machines for producing and treating textile fabrics, paper and foils of various kinds. Such arrangements are used for controlling the tension of bands or tapes and for measuring the loading of a transporting means. Various constructions of the above arrangements have already been proposed; however, these constructions are substantially complicated and expensive. This constitutes an essential disadvantage of the known arrangements which makes their use in serially produced inexpensive machines uneconomical.

SUMMARY OF THE INVENTION

Accordingly, it is an object of the present invention to provide an arrangement for measuring a radial force applied to a bearing which avoids the disadvantages of the prior art arrangements.

More particularly, it is an object of the present invention to provide an arrangement for measuring a radial force applied to a bearing, which is of a simpler construction, less expensive and more compact than the prior art measuring arrangements.

In keeping with these objects, and with others which will become apparent hereinafter, one feature of the present invention is that an arrangement for measuring of a radial force applied to a roller bearing of a device comprises an inner element connected with the roller bearing for joint displacement therewith under the action of the radial force, an outer element mountable on the device and outwardly surrounding the inner element so as to form a gap therebetween, and a web extending through the gap, which web connects the above elements with each other and is stressed in response to displacement of the inner element together with the roller bearing in the radial direction of the gap, whereby signals commensurate with the stressing of the web are originated.

Such arrangement is of an extremely simple construction, easy to manufacture, inexpensive, and very compact. Dimensions of the above measuring arrangement scarcely exceed the dimensions of flanges of the roller bearing.

Another feature of the present invention is that the inner and the outer elements may be formed as rings which are concentric relative to each other. This facilitates mounting of the measuring arrangement of the respective device.

Still another feature of the present invention is that the arrangement comprises means for limiting the displacement of the inner element relative to the outer element, which means are located intermediate said elements. Such means prevent overloading of the web and may be formed as a pin received in a hole formed by two indentations which are provided in the elements and face towards one another.

Still another feature of the present invention is that the arrangement further includes electrical signalling means mounted on the web. These signalling means may be formed as strain gauges mounted on the opposite sides of the web. In this case, it is not required to use additional signal transmitting means which might otherwise produce hysteresis. The strain gauges are connected with an electrical measuring circuit and form together a measuring bridge of this circuit. Four such strain gauges are necessary for forming the complete measuring bridge. In this connection, the strain gauges may be so mounted on the web that one pair of the gauges is mounted on one side of the web whereas the other pair thereof is mounted on the other side of the web.

It is also possible to provide in the arrangement a second outer and inner element axially spaced from the first mentioned elements. In this case, two of the strain gauges are each mounted on the opposite sides of the web connecting the first elements, whereas the other two gauges are mounted on the web connecting the second elements.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
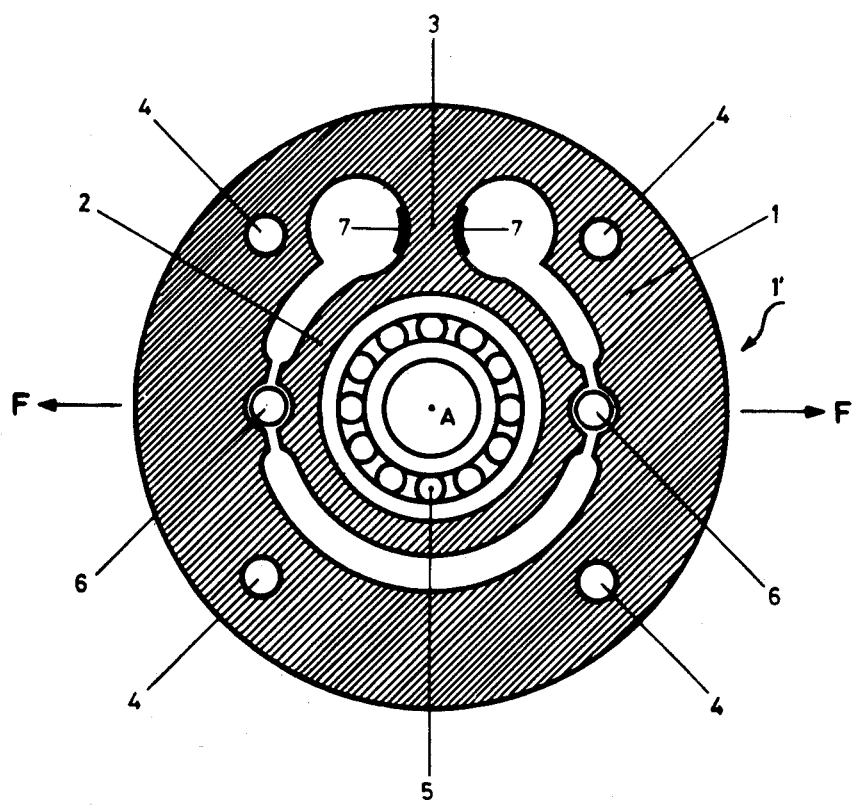
FIG. 1 is a sectioned side view of an arrangement for measuring a radial force applied to a roller bearing, in accordance with the present invention.

An arrangement for measuring a radial force applied to a roller bearing is shown in FIG. 1 and comprises a unit identified in toto by reference numeral 1' which includes an outer element 1 and an inner element 2 outwardly surrounded by the outer element 1 so as to form a gap therebetween. The elements 1 and 2 are connected with one another by a web 3. As shown in the drawing, the elements 1 and 2 are formed as concentric rings having an axis A, and the web 3 extends in the substantially radial direction of these rings. However, the elements 1 and 2 may have a configuration other than ring-shaped, and the web 3 may extend in a direction other than radial. The outer element 1 serves as a flange member for mounting the arrangement on a wall portion of a device or a machine. For this purpose it is provided with mounting bores 4 in which not-shown mounting elements may be inserted. The inner element 2 is mounted on a roller bearing 5 which is subject to a radial force to be measured. The roller bearing 5 rotates in the direction which corresponds to its operational conditions, and may be a self-aligning bearing.

Figure 2:
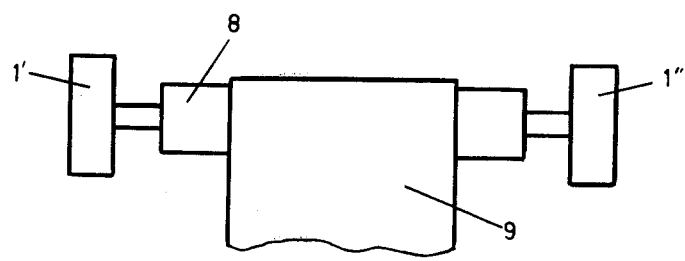
FIG. 2 is a front view of an arrangement in accordance with the invention.

The arrangement may comprise two units, one of which is the above-described unit 1' and the other of which is a unit 1" similar to the first mentioned unit 1'. Such arrangement is illustrated in FIG. 2 showing the units 1' and 1" spaced from each other in the axial direction. The inner rings of the units 1' and 1" are mounted on respective bearing which support opposite sides of a rotatable roller 8 of a transporting means of the device or of the machine. A transporting band 9 is located on the rollers 8 and loads the latter, so that the above radial force to be measured is produced. In spite of the fact that the transporting roller 8 is supported by two bearings located at the axial ends thereof, the measuring arrangement may comprise only one unit mounted on either of the bearings.

When the roller bearing 5 is loaded with a radial force F which results, for instance, from tension exerted by the transporting band 9, the inner element 2 is displaced relative to the outer ring 1 from its concentric position to the left or to the right, in dependence upon the direction of the applied radial force. In this case, the rules relating to one-sided bending of a cantilever are applicable, in accordance with which the displacement of the inner ring 2 as well as a compression and tension of the web 3 are proportional to the applied force F. The displacement of the inner ring 2 is transformed into signals which in turn are subsequently sensed so that the radial force may be determined from the thus sensed signals corresponding to the above displacement and, therefore, also corresponding to the applied radial force.

Figures 3, 4, 5:
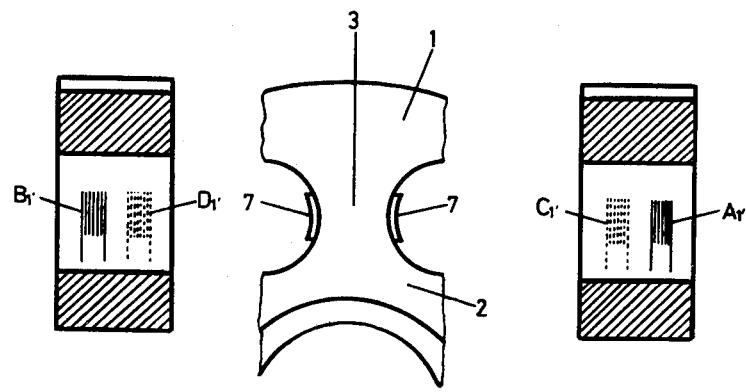
FIG. 3 is an enlarged view of a web which connects the inner and outer elements of an arrangement in accordance with the invention.
FIG. 4 is a side view of the web of FIG. 3.
FIG. 5 is a side view of the web of FIG. 3 in direction opposite to the side view of FIG. 4.

Whereas various signalling means can be used in the arrangement in accordance with the present invention, it is advantageous to use strain gauges which are known per se in the art. As shown in FIG. 3, the strain gauges are identified in toto by reference numeral 7 and are mounted on the side portions of the web 3. When the inner element 2 is displaced under the action of the radial force F in either direction, the strain gauge mounted on the one side portion of the web 3 is compressed whereas the strain gauge mounted on the other side portion of the web 3 is stretched.

Figure 6:
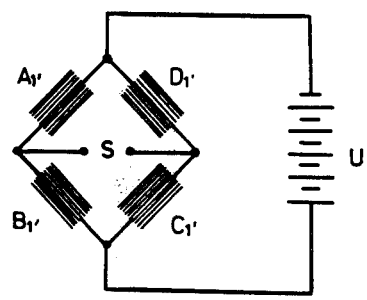
FIG. 6 shows an electrical measuring circuit operatively connected with an arrangement in accordance with the present invention.
Figure 7:
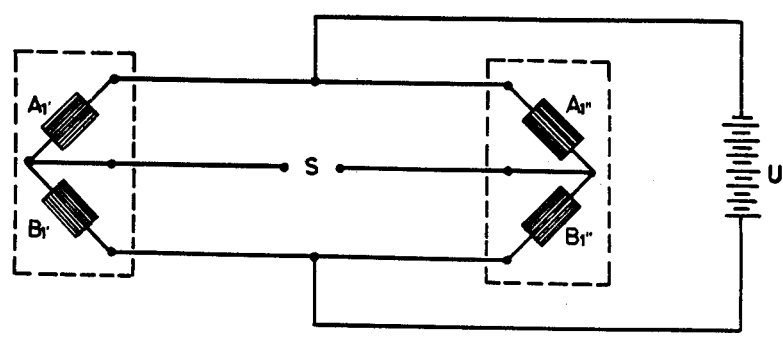
FIG. 7 shows another embodiment of an electrical measuring circuit operatively connected with an arrangement in accordance with the invention.

When the arrangement comprises only one of the units, for instance the unit 1', four strain gauges $A_{1'}$, $B_{1'}$, $C_{1'}$, and $D_{1'}$, are mounted on the web 3 as shown in FIGS. 4 and 5 so that two of the strain gauges are located on the one side portion of the web, whereas the two other strain gauges are located on the other side portion of the web 3. FIG. 6 shows an electrical measuring circuit, including a measuring bridge which is formed by the above four strain gauges. When the arrangement comprises two units 1' and 1" as shown in FIG. 2 of the drawing, it suffices to mount two strain gauges on the web of each of the units, for instance, the strain gauges $A_{1'}$ and $B_{1'}$ on the web of the unit 1' and the strain gauges $A_{1''}$ and $B_{1''}$ on the web of the unit 1". The strain gauges $A_{1'}$ and $A_{1''}$ will be located on the one side portion of the respective web, whereas the strain gauges $B_{1'}$ and $B_{1''}$ will be located on the other side thereof. FIG. 7 shows an electrical measuring circuit with a measuring bridge formed in the case when both units 1' and 1" are provided in the arrangement. Here, two strain gauges $A_{1'}$ and $B_{1'}$ of the unit 1' are electrically connected with two strain gauges $A_{1''}$ and $B_{1''}$ of the unit 1" and form together with the same the above measuring bridge.

It should be mentioned that a force acting in a direction which is normal to the direction of force F, such as a weight of the transporting roller 8, does not affect the measurements of the force F inasmuch as such normal force simultaneously compresses or stretches all the strain gauges, and therefore no detuning of the measuring bridge will occur. Also, a horizontal component of this normal force does not affect the measurements because of the extremely small angle of turning.

Each of the above units of the arrangement may be produced from an integral steel ring, having a thickness corresponding to the width of the roller bearing 5, by means, for instance, of drilling and subsequent milling thereof so as to form the inner ring, the outer ring and the web connecting the rings with one another. It is understood that the units may also be made by other methods, such as cold forming, casting, forging, spark erosion and the like. The outer and inner elements may be made separately from and be subsequently connected with one another by the web which may be welded thereto or inserted in dovetail grooves provided in the elements. The configuration of the outer element 1 is not important for the present invention, and for this reason the outer element may be of a configuration other than annular, e.g., rectangular or otherwise.

The arrangement also comprises means for preventing the web 3 from overloading. For this purpose indentations are provided in the inner element 2 and the outer element 1, which indentations are located adjacent to and face towards one another so as to form together a hole. The above preventing means include pins 6 each located in the respective hole. The pins 6 prevent an excessive displacement of the inner ring 2 relative to the outer ring 1 whereby the overloading of the web 3 is prevented.

As shown in the drawing, the outer ring 1 and the inner ring 2 are concentric relative to one another for the reason that the axes of the mounting flanges must be in alignment with the axis of the roller bearing. Non-compliance with this requirement would not affect the operation of the arrangement; however, it would make mounting of the same on the machine rather difficult.

Whereas the signalling means shown in the drawing are strain gauges, it is understood that various other signalling means may be provided in the arrangement without departing from the basic concept of the present invention. Thus, magnetoelastic, inductive, capacitive, proximity, piezoelectric and like means may be used for transforming the displacement of the inner ring 2 under the action of the radial force F into signals to be subsequently sensed and measured.

Finally, the arrangement may be provided with covers mountable on the opposite sides of the elements, especially for protecting the electrical signalling means. Two covers may be provided which are centered and have portions extending through the mounting bores 4. One of the covers may have a standardized plug socket for connecting with a signal generator.

The units 1' and 1" may be made not only of steel but also of spring bronze, copper, berylium, titanium and other non-ferrous metals.

It will be understood that each of the elements described above, or two or more together, may also find a useful application in other types of constructions differing from the types described above.

While the invention has been illustrated and described as embodied in an arrangement for measuring a radial force applied to a bearing, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A bearing mounting unit for measuring a radial force applied to the mounted bearing, said unit comprising a unitary bearing mounting member having an outer annular portion and an inner annular portion surrounded by said outer annular portion ad defining therewith an annular gap, and a web extending across said gap and being of one piece with said portions so as to support said inner annular portion with freedom of radial displacement relative to said outer annular portion, said inner annular portion having an inner circumferential surface for receiving and retaining therein a rolling contact bearing, said inner and outer annular portions having respective faces which together bound said gap and which are provided at diametrically opposite locations with sets of concave recesses having open sides facing one another across said gap; a pair of overload protecting pins each received in one of said sets of concave recesses and extending parallel to one another and to a central axis of said member; and means mounted on the web for originating and transmitting signals commensurate with the stressing of said web resulting from the radial displacement of said inner annular portion relative to said outer annular portion.

2. The unit as defined in claim 1, wherein said inner and said outer portions are rings.

3. The unit as defined in claim 2, wherein said outer ring is concentric with said inner ring.

4. The unit as defined in claim 2, wherein said web extends in a substantially radial direction of said rings.

5. The unit as defined in claim 1, wherein said last mentioned means is an electric last mentioned means.

6. The unit as defined in claim 1, wherein said portions have an axis and said web has two side portions spaced from one another in a direction substantially transverse to said axis, said last mentioned means including two pairs of strain gauges each mounted on the respective side portion of said web; and further comprising an electrical measuring circuit including a measuring bridge which is formed by said two pairs of strain gauges.

7. The housing as defined in claim 1, wherein said portions have an axis; further comprising a further such inner portion, outer portion and web axially spaced from said first-mentioned inner portion, outer portion and web, said web and said further web each having two side portions spaced from each other in a direction substantially transverse to said axis, said last mentioned means including two pairs of strain gauges each mounted on the respective one of said webs so that one strain gauge of each pair is mounted on one of said side portions of the respective web whereas the other strain gauge of the same pair is mounted on the other side portion of the same web; and further comprising an electrical measuring circuit including a measuring bridge which is formed by said two pairs of gauges.

* * * * *